(12) United States Patent
Liu

(10) Patent No.: US 6,644,139 B2
(45) Date of Patent: Nov. 11, 2003

(54) GEAR STRUCTURE FOR A FIGURINE

(76) Inventor: Da-Ming Liu, 5F, No. 13, Pao-Kao Road, Hsin Tien City (TW)

( * ) Notice: Subject to any disclaimer, the term of this patent is extended or adjusted under 35 U.S.C. 154(b) by 39 days.

(21) Appl. No.: 09/948,545

(22) Filed: Sep. 10, 2001

(65) Prior Publication Data

US 2003/0047017 A1 Mar. 13, 2003

(51) Int. Cl.[7] .................................................. B41J 1/44
(52) U.S. Cl. ................. 74/421 A; 74/421 R; 74/665 F; 74/323; 446/330; 446/353
(58) Field of Search ............. 74/665 F, 665 G, 74/665 GA, 665 K, 323, 412 R, 421 A, 421 R, 432, 435, 436; 446/330, 331, 353, 355

(56) References Cited

U.S. PATENT DOCUMENTS

| | | | | |
|---|---|---|---|---|
| 2,378,709 A | * | 6/1945 | Keen et al. ................... 74/435 |
| 4,152,982 A | * | 5/1979 | Mikoshiba et al. ........ 74/435 X |
| 4,785,362 A | * | 11/1988 | Nozawa et al. ........... 74/435 X |
| 5,069,604 A | * | 12/1991 | Al-Sabih .................. 74/436 X |
| 5,284,064 A | * | 2/1994 | Green et al. ................... 74/435 |
| 5,605,072 A | * | 2/1997 | Schmidt et al. ................ 74/435 |
| 6,210,249 B1 | * | 4/2001 | Stadlbauer .................. 446/330 |
| 6,547,632 B2 | * | 4/2003 | Marine et al. .......... 446/353 X |

* cited by examiner

Primary Examiner—Chong H. Kim
Assistant Examiner—Colby Hansen
(74) Attorney, Agent, or Firm—Bacon & Thomas, PLLC

(57) ABSTRACT

A gear structure for a figurine. The structure includes coaxial gears provided on a shaft, each of the coaxial gears is provided with toothed portions at a periphery thereof at suitable positions, with a smooth portion between adjacent toothed portions. At suitable positions facing the periphery of each of the coaxial gears, action gear sets are respectively provided to drive at least one joint on a figurine to move such that by rotating the shaft to different angular positions, at least one of the toothed portions on at least one of the coaxial gears engages the corresponding action gear set so as to actuate the action gear set, thereby enabling the figurine to perform at least one action.

6 Claims, 4 Drawing Sheets

GEAR STRUCTURE FOR A FIGURINE

FIELD OF THE INVENTION

The invention relates to a gear structure, more particularly to a gear structure of a figurine enabling the figurine to perform at least one action.

DESCRIPTION OF THE RELATED ART

In a conventional robot, there are disposed therein a plurality of drivers and gear structures engaging the respective driver to initiate actions of the four limbs and the head of the robot. In order to enable the robot to perform human-like actions, the gear structure is designed to comprise a large amount of gears so as to enable the robot to perform smooth and diverse actions. As such, the size and weight of the robot, as well as the manufacturing cost thereof, will increase with the number of the drivers used and the construction of the gear structure.

SUMMARY OF THE INVENTION

In view of the large size and weight of the robot and the relatively high manufacturing cost of the conventional robot due to the large number of drivers and the complicated gear structure, the present invention provides a gear structure for a figurine, in which a plurality of coaxial gears are provided on a shaft. Each of the coaxial gears is provided with a plurality of toothed portions at a periphery thereof at suitable positions, with a smooth portion between adjacent toothed portions. At suitable positions facing the periphery of each of the coaxial gears, a plurality of action gear sets are respectively provided to drive at least one joint on a figurine to move such that by rotating the shaft to different angular positions, at least one of the toothed portions on at least one of the coaxial gears engages the corresponding action gear set so as to actuate the action gear set, thereby enabling the figurine to perform at least one action.

DETAILED DESCRIPTION OF THE PREFERRED EMBODIMENT

Figure 1:
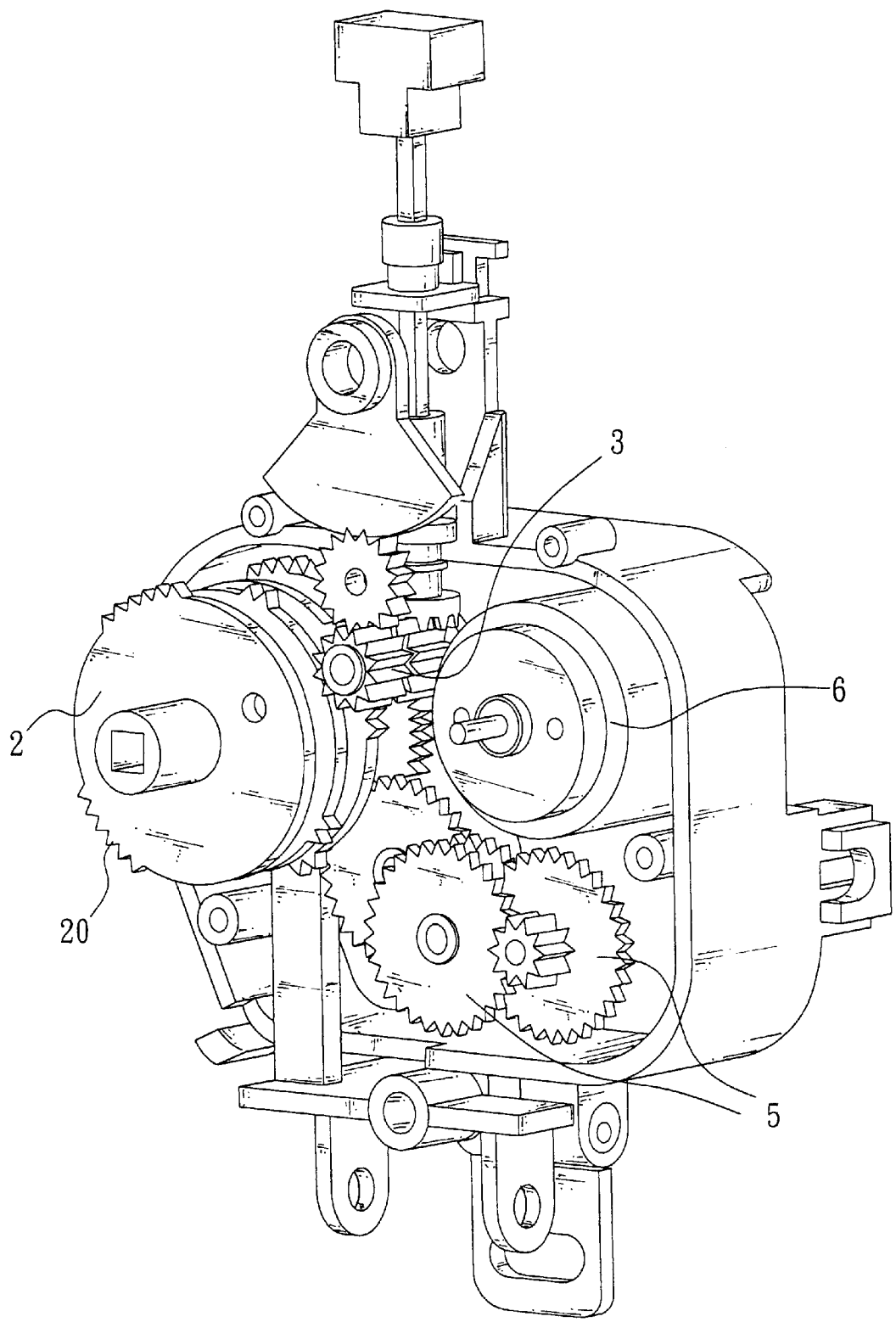
FIG. 1 is a perspective view of the preferred embodiment according to the present invention.

With reference to FIG. 1, a gear structure for a figurine is shown to include a shaft 1 provided with a plurality of coaxial gears 2. Each of the coaxial gears 2 is provided with a plurality of toothed portions 20 grouped together at a periphery thereof at suitable positions, with a smooth portion between adjacent ones of the grouped toothed portions 20. At suitable positions facing the periphery of each of the coaxial gears 2, a plurality of action gear sets 3 are respectively provided to drive at least one joint on a figurine to move such that by rotating the shaft 1 to different angular positions, at least one of the toothed portions 20 on at least one of the coaxial gears 2 engages the corresponding action gear set 3 so as to actuate the action gear set 3, thereby enabling the figurine to perform at least one action.

Figure 2:
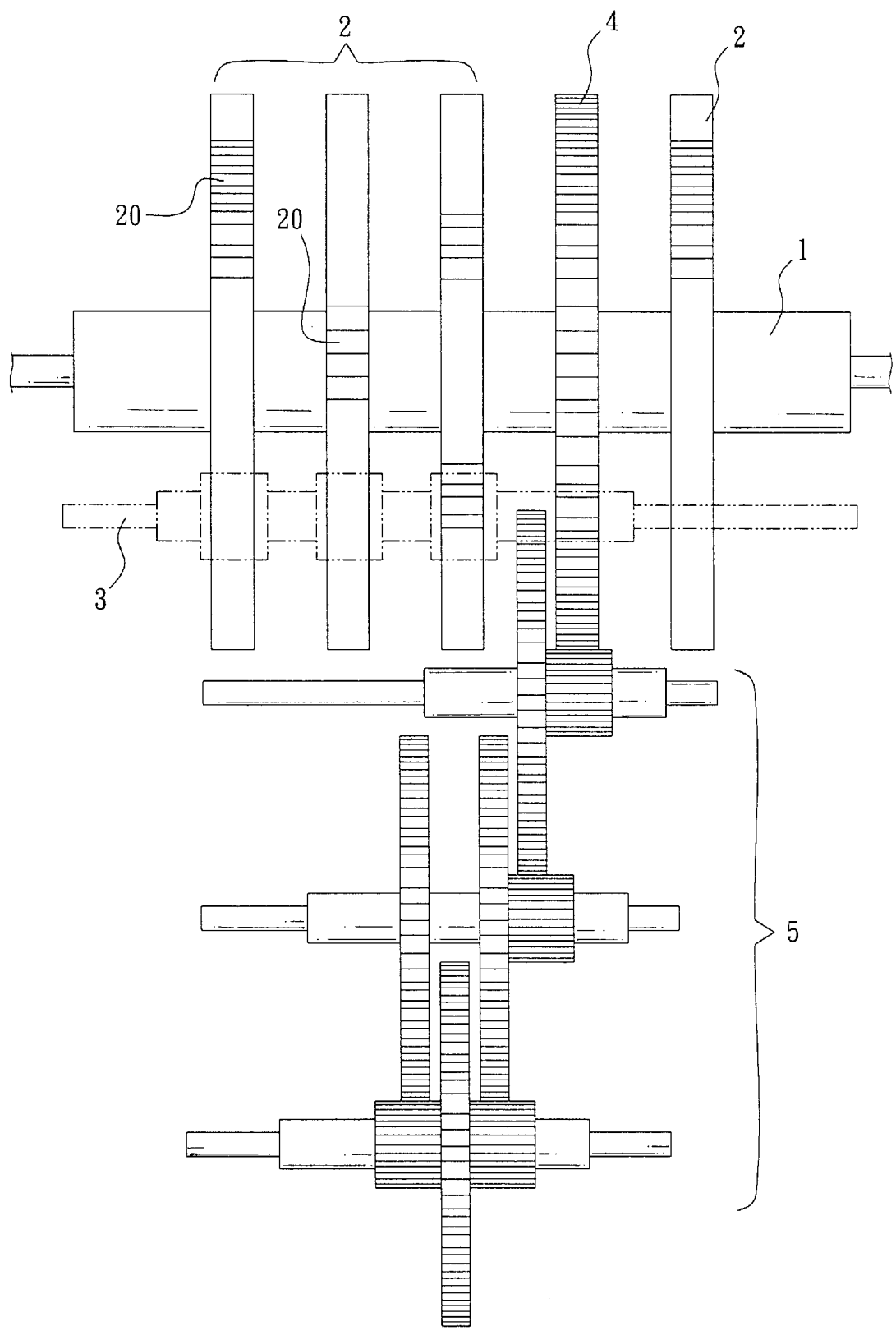
FIG. 2 is a top view of FIG. 1.
Figure 4:
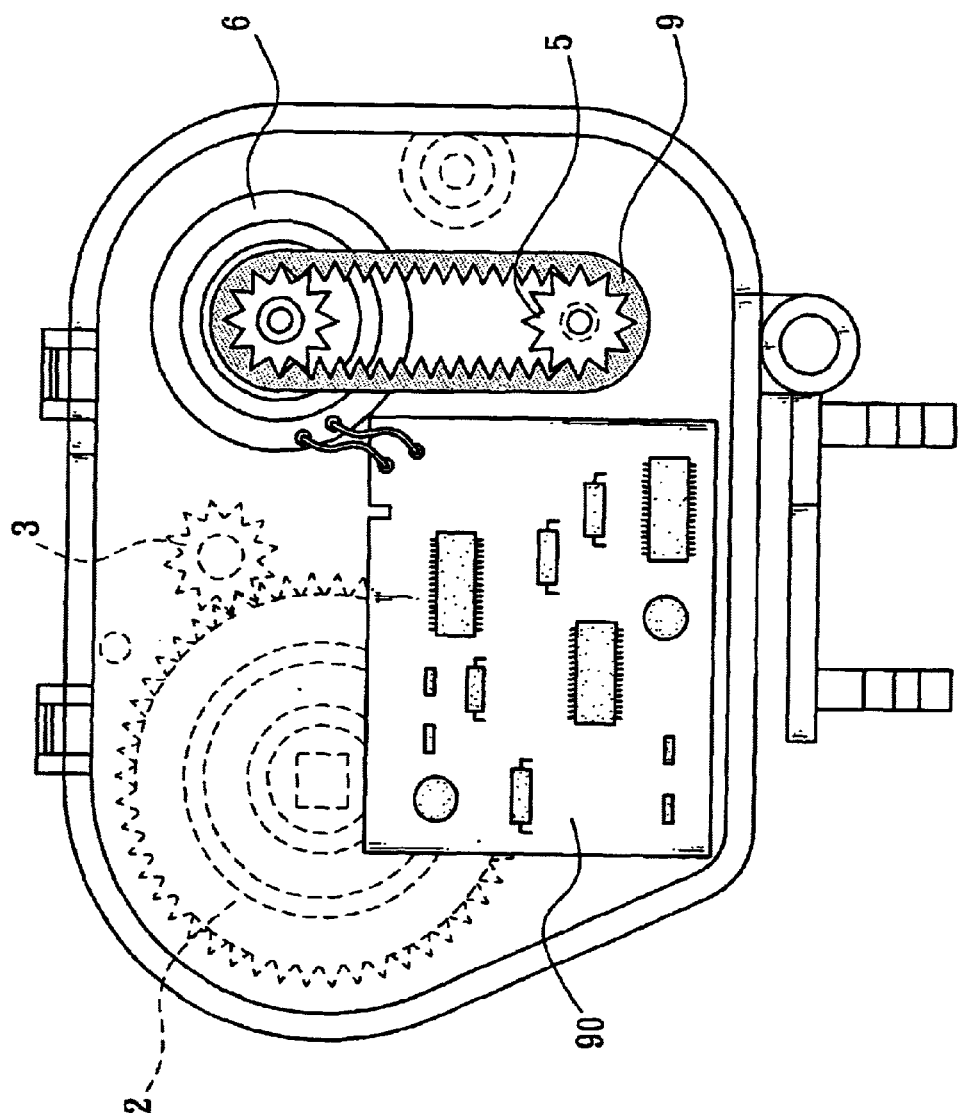
FIG. 4 is a front view of FIG. 1 illustrating the toothed belt and the control circuit.

In this invention, referring to FIGS. 1 and 2, the shaft 1 is provided with a driven gear 4 at a suitable position. The driven gear 4 engages a drive gear set 5 such that the drive gear set 5 drives the driven gear 4 to rotate. The drive gear set 5 engages a driver 6 via a toothed belt 9 (shown in FIG. 4). In this embodiment, the driver 6 may be an electromotor or a step motor, but is not limited thereto in actual practice. The driver 6 is connected to a control circuit 90 (shown in FIG. 4). By controlling the operation (which includes clockwise rotation, counterclockwise rotation, and angles of clockwise and counterclockwise rotation) of the driver 6 via the control circuit, the direction and angle of rotation of the drive gear set 5 can be controlled such that the drive gear set 5 can bring the driven gear 4 to rotate in a clockwise or counterclockwise direction and about an angle to a suitable position so as to control the state of engagement between each of the toothed portions 20 and the action gear sets 3 engaged therewith, thereby enabling the figurine to perform different actions.

Figure 3:
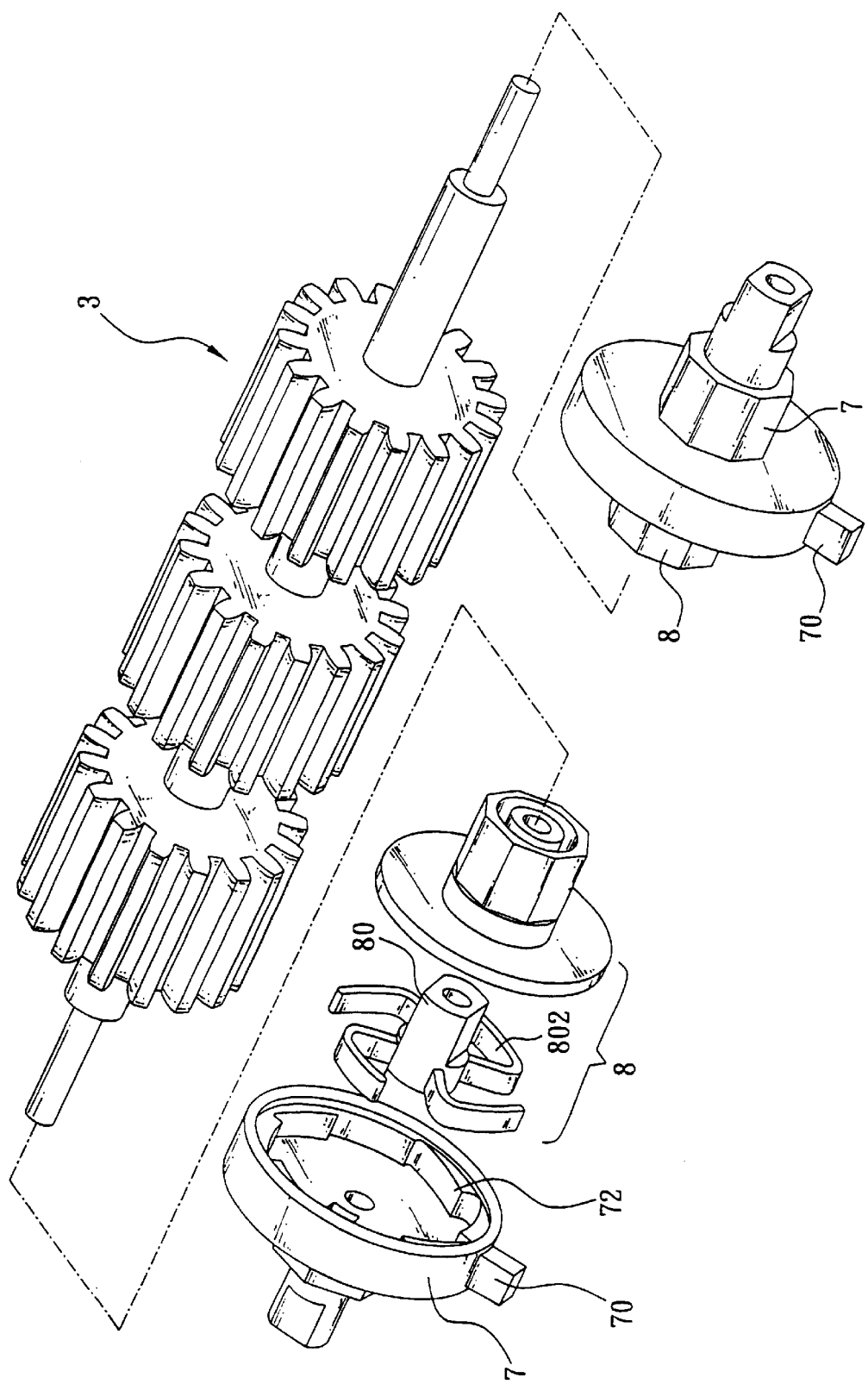
FIG. 3 is a schematic view illustrating the action gear sets, the limiting wheel and the reset wheel in an assembled state.

If the driver 6 always rotates in the same direction, each of the toothed portions 20 will repeatedly bring the corresponding action gear sets 3 to rotate, this will cause the figurine to continuously perform the same repeated actions. In case a user has observed the figurine for a time, he/she will find out this phenomenon and will feel that the actions of the figurine are not smooth. In particular, if the figurine is a robot simulating a human being, the robot will perform actions that do not match the joint movement of a human being (e.g., the head of the robot will swing through 360 degrees). Therefore, in order to solve the aforesaid problem, in a preferred embodiment of the present invention, referring to FIG. 3, the action gear set 3 is provided with a limiting wheel 7 and a reset wheel 8 connected to the limiting wheel 7 at suitable positions. The reset wheel 8 is disposed at a position proximate to the toothed portion 20, and has an inner edge provided with a lap block 80. The lap block 80 is provided with a plurality of radially extending elastic arms 802 that are bent about a suitable angle. The limiting wheel 7 has an outer edge provided with at least one limiting portion 70 at a suitable position, and an inner edge provided with a plurality of equidistantly spaced oblique surfaces 72 having a gradual thickness from thick to thin (or from thin to thick). The juncture of adjacent oblique surfaces 72 is abutted against by the respective elastic arm 802.

When the driven gear 4 brings the coaxial gear 2 to rotate to cause the respective toothed portion 20 to continuously bring the action gear sets 3 to rotate, the elastic arms 802 within the reset wheel 8 will abut against the junctures between adjacent oblique surfaces 72 so as to bring the limiting wheel 7 to rotate. When one of the limiting portions 70 of the limiting wheel 7 is retained, the limiting wheel 7 cannot rotate any further. At this time, the reset wheel 8, by virtue of the elasticity of the elastic arms 802, can pass beyond the junctures between adjacent oblique surfaces 72 so that it can continue to be driven by the driven gear 4. At this time, since the driven gear 4 continues to drive the coaxial gear 2 to rotate, the toothed portions 20 of the respective coaxial gear 2 can continue to be rotated to the position of the corresponding action gear set 3 to continue performing other actions. In addition, when the driven gear 4 drives the coaxial gear 2 to rotate in a reverse direction, the elastic arms 802 within the reset wheel 8 will slide along the oblique surfaces 72 and cannot drive the limiting wheel 7 to rotate. As such, so long as the positions of the limiting portions 70 are calculated with precision prior to designing the limiting wheel 7, it can be ensured that the robot will not perform actions that do not match the swinging movement of the human joints.

What is claimed is:

1. A gear structure for a figurine, comprising:

a shaft;

a plurality of coaxial gears, said coaxial gears being provided on said shaft, each of said coaxial gears being provided with a plurality of toothed portions at a periphery thereof at suitable positions, with a smooth portion between adjacent toothed portions;

a plurality of action gear sets, said action gear sets being provided at positions facing the periphery of a respective one of the coaxial gears to bring at least one joint on a figurine to move, said shaft being rotated to different angular positions such that at least one of the toothed portions on at least one of the coaxial gears engages a corresponding one of said action gear sets so as to actuate said action gear set, thereby enabling the figurine to perform at least one action; and wherein said action gear sets are provided with a limiting wheel and a reset wheel connected to said limiting wheel at suitable positions, said reset wheel being disposed at a position proximate to said toothed portion and having an inner edge provided with a lap block, said lap block being provided with a plurality of radially extending elastic arms that are bent about a suitable angle, said limiting wheel having an outer edge provided with at least one limiting portion at a suitable position, and an inner edge provided with a plurality of equidistantly spaced oblique surfaces having a gradual thickness from thick to thin, a juncture of adjacent oblique surfaces being abutted by a respective one of the elastic arms.

2. The gear structure for a figurine as claimed in claim 1, wherein said shaft is provided with a driven gear at a suitable position, said driven gear engaging a drive gear set such that said drive gear set drives said driven gear to rotate.

3. The gear structure for a figurine as claimed in claim 1, wherein said drive gear set engages a driver via a toothed belt, said driver being connected to a control circuit, operation of said driver being controlled via said control circuit so as to control the direction and angle of rotation of said drive gear set such that said drive gear set can bring said driven gear to rotate in a clockwise or counterclockwise direction at a suitable angular position so as to control engagement between each of said toothed portions and said action gear sets engaged therewith, thereby enabling the figurine to perform different actions.

4. The gear structure for a figurine as claimed in claim 3, wherein operation of said driver includes clockwise rotation, counterclockwise rotation, and angles of clockwise and counterclockwise rotation, such that said drive gear set can bring said driven gear to rotate in a clockwise or counterclockwise direction.

5. The gear structure for a figurine as claimed in claim 3, wherein said driver is an electromotor.

6. The gear structure for a figurine as claimed in claim 3, wherein said driver is a step motor.

* * * * *